Dec. 10, 1935.    M. KAHN    2,024,100
BUMPER, PARTICULARLY FOR AUTOMOBILE DOORS
Filed May 12, 1933
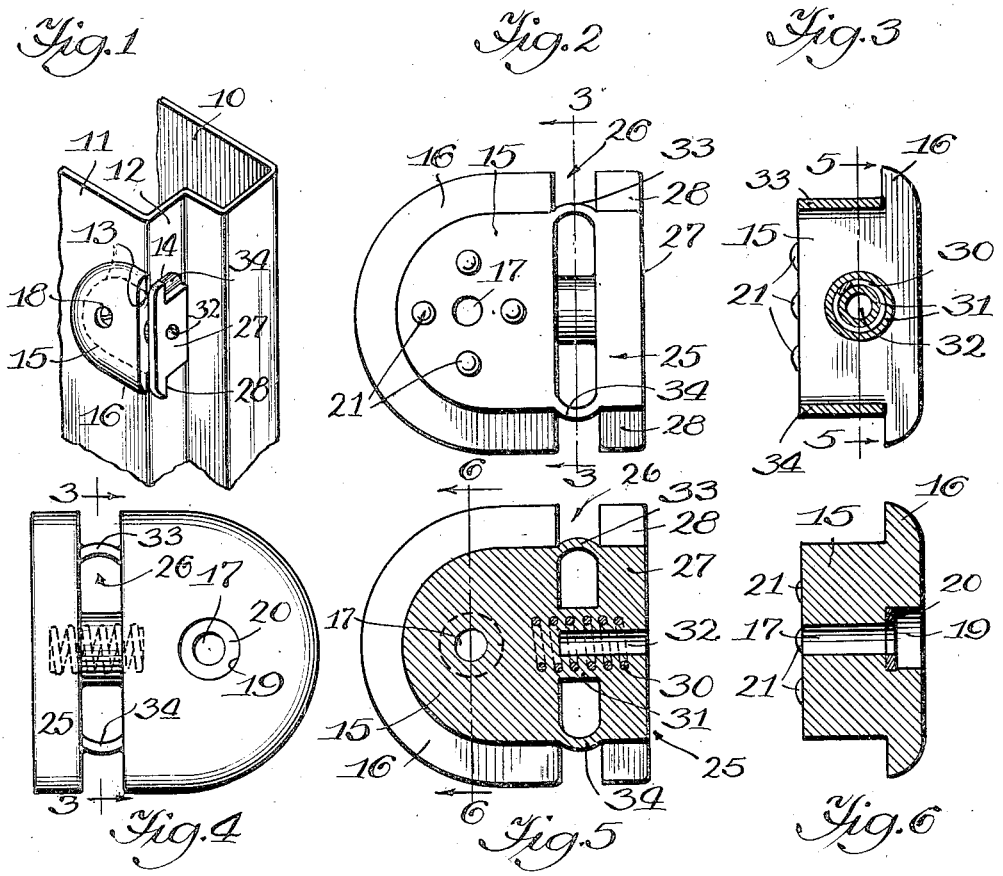
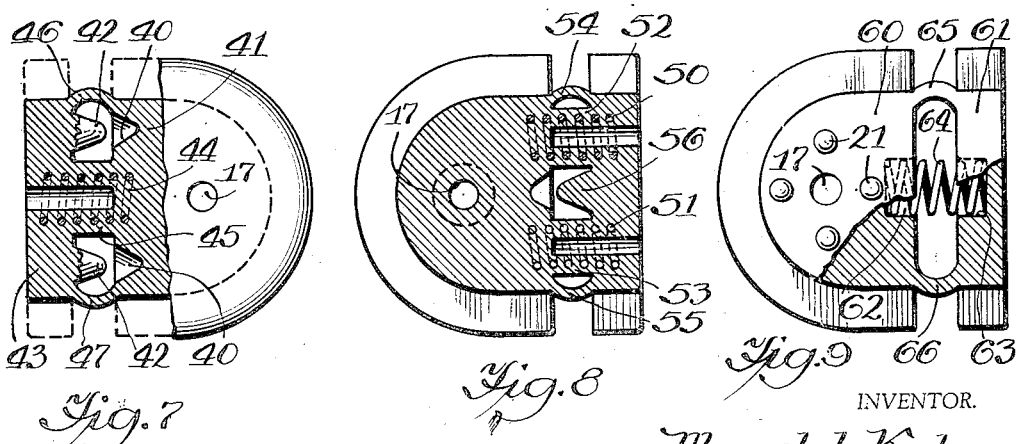
INVENTOR.
Mandel Kahn,
BY W. Bartlett Jones.
ATTORNEY.
Witness:
Chas. R. Koursh.

Patented Dec. 10, 1935

2,024,100

UNITED STATES PATENT OFFICE 2,024,100

BUMPER, PARTICULARLY FOR AUTOMOBILE DOORS

Mandel Kahn, Chicago, Ill., assignor to Harry H. Kahn, Wilmette, Ill.

Application May 12, 1933, Serial No. 670,637

14 Claims. (Cl. 16—86)

The present invention relates to resilient door bumpers or snubbers, with particular reference to the doors of automobiles.

Heretofore, it has been a practice to use a resilient bumper of resilient material, such as rubber. In the case of automobiles one snubber or bumper has been mounted in an opening provided therefor in the door jamb, usually a pillar, in the case of both wooden and sheet metal construction. In many instances a standard form of opening is provided for receipt of a standard shape of snubber.

One of the disadvantages of rubber snubbers is the insufficient resilience of the moulded rubber compound of which the snubber is made. The present invention overcomes this disadvantage by providing a resilient construction in the snubber which is independent of the material of the snubber.

One object of the invention is the provision of a snubber having two parts flexibly joined together, with the interposition between the parts of mechanical spring means.

Another object of the invention is the moulding of a snubber in a two-part integral unit capable of receiving in functional relation to the two parts, a mechanical spring element.

Still another object of the invention is the moulding of a snubber in a two-part integral unit with a mechanical spring element incorporated in the unit and moulded in situ therein.

Various other and ancillary objects and advantages of the invention will become apparent from the following description and explanation of the invention as exemplified by the preferred and modified embodiments thereof which are shown in the accompanying drawing in which:

Fig. 1 represents an automobile door post equipped with a door snubber embodying the present invention.

Fig. 2 is a rear view of the door snubber shown in Fig. 1.

Fig. 3 is a cross-section of the bumper shown in Fig. 2 taken on line 3—3 of Fig. 2 and of Fig. 4.

Fig. 4 is a face view of the bumper shown in Fig. 1 and Fig. 2.

Fig. 5 is a cross-section of the bumper of Fig. 2 taken on the line 5—5 of Fig. 3 showing the spring embedded in the unit.

Fig. 6 is a cross-section of the bumper taken on the line 6—6 of Fig. 5.

Fig. 7 is a modified form of the bumper shown in Fig. 2 having the additional alining means.

Fig. 8 is another modified form having two embedded springs in the structure and one alining device.

Fig. 9 is a modified form in which the compressible spring is removably inserted in sockets constructed for receipt of the spring.

In the preferred form of the device I have employed a resilient rubber composition and an integrally moulded article, largely because of the cheapness of material and the convenience of manufacture, and in part because the resilience of the material, though not essential to the invention, is advantageously utilized therein. Therefore, it is to be understood that the invention is not limited to resilient material like rubber compound, and that numerous variations and modifications may be made in actual practice of the invention as expressed in the appended claims.

In Fig. 1, numeral 10 represents a metal door post or pillar, such as may be found on an automobile. The faces 11 and 12 are cut away providing a recess, of which the edges 13 and 14 are designated. The recess is standard in many makes of automobiles, and into it a standard solid rubber snubber may be renewably inserted by means of a screw mounting. The standard recess contains a back ledge or plate (not shown) against which the snubber rests and in which the mounting screw engages.

Standard snubbers project beyond the pillar face 12 and operate by resilience of the entire block. In accordance with the present invention this projecting part of the snubber is resiliently carried by the remainder of the unit, substantially independently of the resilience of the material. A body portion adapted to fit into the pillar recess is provided having a heel 15 which fits snugly into the pillar recess, and a flange 16. A hole 17 for a mounting screw 18 (Fig. 1) is provided with an enlarged portion 19 for the screw head. In the bottom of the portion 19 a metal washer 20 may be inserted for seating the underside of the screw head. At the inner face of the heel projecting buttons or nubs 21 may be formed for direct contact with the mounting plate in the recess (not shown). Where the heel and flange of the body are made of resilient rubber compound these features have functions in securing a rigid mounting of the snubber.

The projecting shock-receiving part of the snubber is represented by the part designated 25. This is tied to and carried by the heel or body by semi-rigid yet flexible or yielding means. In form the part 25 is shown herein as an extension in line only of the heel 15 and its flange 16, a slot or gap 26 existing between the two, across which gap the tying carrier means extends. The body of part 25 is designated as 27 and the flange part as 28.

Mechanical spring means taking up compression between the parts is employed as an essential new element of the device, and it may be incorporated in several ways, some of which are hereinafter set forth. One of these ways is by moulding a coiled steel spring in the device, as when both parts are integrally made of resilient material such as rubber. In this event the spring may be entirely enclosed in rubber, or it may be exposed. With one end embedded in each part it serves as a carrier-tie between the parts, either alone or in combination with rubber or resilient compound extending with the spring across the space 26. In the preferred form which is made of rubber, there is a spring 30 embedded in a connecting stud 31 of rubber or resilient compound. Thus the rubber of stud 31 is a protection against corrosion of the steel spring. The hole 32 has no function but is merely the result of the moulding process in which a pin holds the spring in place in the mould.

In addition to the carrier-tie provided by the spring 30 and stud 31, there are other ties of semi-rigid yet flexible or yielding material, such as those shown at 33 and 34. In the moulded rubber unit these are webs of rubber across the space 26, normally bowing outwardly so that on compression they will not bow inwardly and be pinched between the parts, or obstruct the compression of the parts. Whenever, as in the modification of Fig. 9, no spring or stud serves as a carrier-tie the entire carrier function may be exerted by the webs or ties 33 and 34. Whenever the parts are not unitarily moulded, or of flexible material, the webs may be mechanically secured to the parts, rather than being integral as described. In addition to the carrier function, they serve to keep the bumper portion properly alined with the body portion in normal static condition, and under stress of operation.

In Fig. 7 a modified form is shown in which the juxtaposed faces of the two parts are provided with cooperative alining means, such as the conical recesses 40 in the heel 41 (corresponding to heel 15) and the conical lugs 42 on the movable body 43 (corresponding to part 27). This modified form has the same construction otherwise comprising spring 44, connecting stud 45 and bowing webs 46 and 47. The length of the conical recesses and lugs may be adjusted to control the approach of the parts in actual usage. As a result of the stud 45 being a torsion axis, the alining means aids in preserving the webs 46 and 47 from tearing.

In Fig. 8 a modification is shown in which the construction is generally the same, with the employment of two springs 50 and 51. In the event a rubber unit is moulded these are preferably housed in rubber studs 52 and 53. Webs 54 and 55 may be dispensed with under these conditions, as the two springs and studs assume some of the functions of the web. However, they are desirably retained to act in part as a cover for the cavity which might otherwise exist. The value of the covering function appears clearly by examination of Fig. 1. Where two springs are used, one conical structure may be used if desired, as illustrated generally at 56.

In Fig. 9 a modified mounting for the spring is shown which may be used in the one-spring or the two-spring structures of the remaining views. The heel or body 60 and the movable carried body 61 each have opposing recesses therein designated respectively 62 and 63. A loose spring 64 is mounted with ends in these recesses. In this structure the spring functions only to resist compression in the act of door-snubbing and the carrier function is supplied entirely by webs 65 and 66, which may be made thicker for this purpose.

When the shock-receiving part 27 is of resilient rubber composition or of other substance making it somewhat flexible there is a distinct advantage. The said part 27 does not then move as a rigid body until it may have flexed and accommodated its bumping surface so that it will be flush with the contacting surface of the striking body, or door. This is a great advantage over the metallic spring-pressed plungers in casings, and over the solid rubber buffers of the prior art. Thus the buffer surface exposed to the door is uniformly subjected to usage and it maintains a neat and uniform appearance without exhibiting local deformities after a considerable use. Since doors are not always true, and may be sprung, this facility for accommodation is still more useful.

In practical use of the invention wherein I have made integrally moulded forms of resilient rubber composition, I have found that some of the gaps and spaces which are shown open in the drawing are actually closed or spanned by thin webs of rubber produced without intent by the character of mold employed. These stray parts have no intended function, and do not materially add to or detract from the advantages of the forms disclosed. They may be but need not be removed from the articles as it is sold in commerce.

Having fully explained the invention it is apparent that the material of the device does not need to be rubber, although such material is advantageous and is preferred. Both parts, but in particular the heel, may be of rigid material. From the foregoing explanation of the invention it is obvious that numerous other changes and modifications may be made without departing from the spirit and scope of the invention as expressed in the appended claims.

The present application is closely related to the applicant's copending applications Serial No. 714,048 and Serial No. 714,049, both filed March 5, 1934. Application Serial No. 714,049 contains broad claims to subject matter disclosed and more specifically claimed in this application.

I claim:

1. A door bumper comprising in combination a carrier body adapted to be fixedly mounted, a flexible shock-receiving part openly spaced from and carried by said body and movable toward said body across said space, flexible tie-means connecting opposite ends of said part to said body, and a compression spring positioned between said tie means and mounted between said body and part and crossing a part of said open space for resisting motion of said part toward said body.

2. A door bumper comprising in combination a carrier body adapted to be fixedly mounted, an externally located shock-receiving part openly spaced from and carried by said body and movable toward said body across said space, flexible tie-means connecting said part and body and serving as a connecting carrier between said part and said body, and a compression spring removably inserted between said part and body for resisting motion of said part toward said body, said tie-means and said spring occupying only a part of said open space.

3. A door bumper as an integral unit comprising a moulded resilient rubber composition, said unit comprising a body portion adapted to be fixedly mounted, a shock-receiving part separated therefrom by a gap, tying webs of flexible nature connecting said body and part, and compression spring means between said body and part, said webs and said spring occupying only a portion of said open gap.

4. A door bumper as an integral unit comprising a moulded resilient rubber compositon, said unit comprising a body portion adapted to be fixedly mounted, a shock-receiving part separated therefrom by a gap, tying webs of flexible nature connecting said body and part, and a coiled compression spring extending lengthwise between said body and part, having an end located in each part.

5. A door bumper as an integral unit comprising a moulded resilient rubber composition, said unit comprising a body portion adapted to be fixedly mounted, a shock-receiving part separated therefrom by a gap, and tying webs of flexible nature connecting said body and part, an integral connection of rubber composition extending across said gap between said body and part, and a coiled spring embedded in said connection.

6. A door bumper as an integral unit comprising a moulded resilient rubber composition, said unit comprising a body portion, a shock-receiving part separated from the body portion by a gap, an integral stud connection of said resilient composition extending across said gap between said parts, and a coiled compression spring embedded in said stud.

7. A door bumper as an integral unit comprising a moulded resilient rubber composition, said unit comprising a body portion, a shock-receiving part separated from the body portion by a gap, an integral stud connection of said resilient composition extending across said gap between said parts, a coiled compression spring embedded in said stud, and a flexible tying connection between said body and part elsewhere across said gap.

8. A door bumper as an integral unit comprising a moulded resilient rubber composition, said unit comprising a body portion, a shock-receiving part separated from the body portion by a gap, an integral stud connection of said resilient composition extending across said gap between said parts, a coiled compression spring embedded in said stud, and a flexible tying connection between said body and part at an end of said gap, said tying connection normally bowing outwardly away from said gap whereby to avoid being pinched in said gap upon compression of the body and part.

9. In a device of the class described having one part adapted to be mounted, and another part movably, resiliently mounted to be yielding toward said first part, and capable of torsional motion with respect thereto, and alining means, comprising a stud on one part located away from the axis of torsional motion, and adapted to fit into a cooperating receiving recess in the other part.

10. A door bumper of resilient composition having a general block-like form with portions of the composition absent near one end of the block and across the same whereby to form a gap, a mounting part, and shock-receiving part flexibly and movably carried by the connecting portions of the block across said gap, the said gap being of substantial width to accommodate motion of said part toward said body and a mechanical compression spring mounted between said parts within the gap to resist said motion upon compression between the parts.

11. A door bumper comprising in combination a carrier body adapted to be fixedly mounted, a shock-receiving part located in spaced relation to said body for motion towards said body, a mechanical spring element positioned to lie between said body and said part to resist motion upon compression between them, and flexible connecting and supporting means flexibly to mount said part on said body whereby the shock-receiving part is carried by said body.

12. A door bumper comprising in combination a relatively rigid body portion to be mounted, a flexible shock-receiving member spaced away from said body with open space between, flexible supporting means connecting said body and said part across a portion of the intervening space, and a compression spring in a portion of the remainder of the intervening space for resisting motion of said part toward said body.

13. A door buffer comprising in combination a relatively rigid body portion to be mounted, a flexible shock-receiving member spaced away from said body with open space between, flexible tie-means connecting the said body and part across a portion of the intervening space, and a supporting compression spring extending across a portion of the remaining open space, said spring having one compression end secured to the body and the other compression end secured to the shock receiving part.

14. A door bumper comprising in combination a relatively rigid body portion to be mounted, a resilient rubber shock-receiving part spaced away from said body with open space between, flexible resilient integral rubber connecting means extending from said part across a portion of said open space and secured to said mounting body, and a compression spring between said part and said body in a portion of the remainder of said open space.

MANDEL KAHN.